United States Patent Office 3,374,134
Patented Mar. 19, 1968

3,374,134
METHOD OF PRODUCING A PRESSURE SENSITIVE ADHESIVE TAPE
Harold Louis Waldman, Hazlet, N.J., assignor to Johnson & Johnson, a corporation of New Jersey
No Drawing. Filed Aug. 25, 1964, Ser. No. 392,040
4 Claims. (Cl. 156—239)

ABSTRACT OF THE DISCLOSURE

Pressure-sensitive adhesive sheets and tapes are prepared by forming a pressure-sensitive adhesive film, priming the surface of the adhesive film with a water base primer, the water base of the primer acting to prevent adhesion of the pressure-sensitive adhesive to priming equipment during the priming operation, and thereafter drying the primed adhesive surface and pressing a backing into intimate contact with the primed adhesive surface to form a strongly bonded laminate of adhesive and backing.

---

This invention relates to pressure sensitive adhesive coated sheets and more particularly to a method of producing pressure sensitive adhesive coated sheets containing a primer between the backing and the adhesive mass.

Films of many pressure sensitive adhesives, and especially the rubber base pressure sensitive adhesives, can not be directly bonded securely to certain desirable backing materials. Therefore, when tapes utilizing these adhesives and backings are produced, it is usually necessary to use an intermediate or so-called primer layer between the adhesive mass and the backing; thus securing the adhesive film to the backing through the bond between the primer and the backing.

Heretofore, it has been thought to be necessary, and it has been conventional practice, to prime the backing material by coating thereon a film of the primer, and then coating and bonding the adhesive mass to the primed backing. However, considerable difficulty has been encountered in priming many backings, especially those made of non-fibrous, nonmetallic, impervious, hydrophobic, organic films; such as polyvinyl chloride, copolymers of polyvinyl chloride and polyvinyl acetate, cellulose acetate, cellulose propionate, cellulose nitrate, etc. These materials are, in general, quite flexible, and somewhat extensible; and are therefore difficult to handle during manufacturing and especially during the coating operation. Therefore, it has been normal practice to use a carrier sheet to lend support to the tape structure as it advances on the production line.

Unless the backing is securely adhered to the carrier sheet, the forces exerted on the backing during coating will often cause the backing to wrinkle and double back on itself. To avoid this problem, it has been the accepted procedure to form the film on the carrier sheet by casting the film in the form of an emulsion of the backing material. The film may then be primed and the adhesive mass applied to the primed backing by calendering or similar means. After drying, the finished tape is stripped off the carrier sheet. Since the cast film adheres to the carrier sheet, the backing does not wrinkle during the priming and coating operations.

Although products prepared in this way have been satisfactory, the method has been somewhat inefficient. In cases where the backing material is available in a state suitable for solvent casting, the cost of such material is substantially greater than that of similarly available preformed films. If, on the other hand, the starting material is the free film, it is necessary to grind the film and digest it in a solvent carrier; thus again resulting in a higher cost of production and an added production step.

In the production of pressure sensitive adhesive coated tapes where a primer is not used, it has heretofore been proposed to cast a film of adhesive mass on a carrier sheet to bond a pre-formed backing to the adhesive mass. When this method is used to produce tapes containing adhesive masses and backings requiring primers, and it is attempted to prime the cast adhesive mass by calendering, reverse roll coating, or other similar means; the tacky adhesive mass adheres to the coating apparatus and is often stripped from the carrier sheet.

It is therefore an object of this invention to provide a method of producing a pressure sensitive adhesive sheet containing an adhesive and a backing which requires the use of a primer; compressing forming a film of the adhesive mass on a supporting surface, priming the adhesive film, and bonding a pre-formed backing to the primed adhesive.

It is another object of this invention to provide a method whereby a supported pressure sensitive adhesive film may be primed without the adhesive sticking to the priming apparatus or being stripped from the supporting surface.

It has now been discovered that it is possible to provide such a method by forming a film of the adhesive on a supporting surface, priming said adhesive film by coating the exposed surface of said adhesive film with a water based primer, drying the primed adhesive film, and bonding said primed adhesive film to the pre-formed backing to form a laminated structure by pressing the primed adhesive film against the backing. Surprisingly, when the adhesive film is primed with a water based primer, the adhesive mass is de-tackified and does not stick to the coating apparatus and is not stripped from the supporting surface.

Any of the conventional normally tacky and pressure sensitive adhesive masses; for example the natural rubber based adhesives, such as wild rubber and crepe rubber; the synthetic rubber based adhesives, such as styrene butadiene copolymers and butadiene acrylonitrile copolymers; the vinyl based adhesives, such as polyvinyl acrylate and polyvinyl ether; or the like; may be used in the method of this invention. Some of these pressure sensitive adhesives are self-priming, and therefore will adhere to the backing without the use of a primer; they may, however, still be used in the method of this invention.

The adhesive film is formed on the supporting surface by calendering or other suitable means. If the supporting surface or carrier sheet does not have good release properties with respect to the adhesive from which the film is to be formed, it should be pre-treated with one of the conventional release agents. The coating weight of the adhesive film depends upon the desired properties of the finished tape; the various considerations being well known in the art.

The supported adhesive film is then primed by coating the exposed adhesive surface with a water based primer composition which will improve the bond between the adhesive and the backing. The primer is applied by reverse roll coating, doctor blade, or other suitable means at a coating weight sufficient to impart the desired bond between the adhesive and the backing to be adhered thereto. In general, the primer dry coating weight will constitute less than about 0.1 ounce per square yard.

Any of the conventional water base primers may be used in the method of this invention. For adhesives and backings where solvent based primers have conventionally been used, a primer containing the same basic composition except that the solvent has been replaced by approximately equal amounts of water will be satisfactory. Especially useful solvent base primers that can be so used are those discussed in United States Patent 2,647,843, issued to C. W. Bemmels.

After drying, which can usually be accomplished in less than ten minutes at a temperature of 200° Fahrenheit, the primed adhesive is bonded to the backing material by firmly pressing the backing material against the primed adhesive to form a laminated structure while maintaining the same at a temperature of at least 200° Fahrenheit, but substantially below the softening point or fusion point of the backing. The flow properties of pressure sensitive adhesives are such that if the bonding is carried out much below 200° Fahrenheit, a strong bond between the primed adhesive and the film will generally not form. At temperatures near the softening point or fusion point of the backing material, damage to said backings may occur. Sufficient pressure must be used to obtain intimate contact between the primed adhesive and the backing. In some cases, it may be desirable to use pressures up to 1,000 pounds per square inch or more to insure continuous intimate contacting of the adhesive and the backing, and thus a uniform bond.

The invention will be further illustrated in greater detail by the following examples. It should be understood that although these examples may describe some of the more specific features of the invention, they are given only for the purpose of illustration and the invention should not be construed as limited thereto.

*Example I*

A normally tacky and pressure sensitive adhesive composition, consisting of 100 parts by dry weight of a butadiene/acrylonitrile copolymer (Hycar 1022—B. F. Goodrich) and 70 parts by dry weight of an alkylphenolic tackifier resin (Schenectady 103—Schenectady Varnish Company) is prepared at 20% solids in a fifty-fifty by volume methyl ethyl ketone-toluene solution. A film of the adhesive having a dry coating weight of 1.5 ounces per square yard is formed on a silicone coated carrier sheet by calendering.

A primer composition containing 5 parts by weight of a high molecular weight copolymer of 25% by weight acrylonitrile and 75% by weight butadiene, 5 parts by weight of a copolymer of equal parts of styrene and butadiene (Mooney viscosity—50), 90 parts by weight of water is formulated. The primer is coated by reverse roll coating on the supported adhesive film at a dry coating weight of 0.1 ounce per square yard. The supported laminate is dried for 10 minutes at 185° Fahrenheit.

A 4 mil thick polyvinyl chloride film (100 parts polyvinyl chloride, 30 parts tricresyl phosphate, and 22 parts of a polymeric plasticizer; weight—3.84 ounces per square yard; tensile strength—3.52 pounds) is positioned on the primed adhesive film. The polyvinyl chloride film is bonded to the primed adhesive by pressing the two together while maintaining the laminate at a temperature of 200° Fahrenheit and applying a pressure of 1,000 pounds per square inch with a Carver Press.

The completed tape has excellent pressure sensitive adhesive properties; and, when wound on itself in the form of a roll, it may be unwound without the adhesive tearing away from the primer or the primer tearing away from the backing material.

*Example II*

A film of the adhesive composition of Example I is formed on a carrier sheet substantially as described therein. A solvent based primer composition, containing 5 parts by weight of a high molecular weight copolymer of 25% by weight acrylonitrile and 75% by weight butadiene, 5 parts by weight of a copolymer of equal parts of styrene and butadiene (Mooney viscosity—50), 45 parts by weight of toluene, and 45 parts by weight of acetone, is formulated.

It is attempted to prime the adhesive film by coating the primer onto the exposed surfaces of said film by reverse roll coating methods. The adhesive adheres to the coating rolls and is partially stripped from the carrier sheet.

Although several specific examples of the inventive concept have been described, the same should not be construed as limited thereby to the specific features mentioned therein, but to include various other equivalent features as set forth in the claims appended hereto. It is understood that any suitable changes may be made without departing from the spirit and scope of the invention.

What is claimed is:

1. A method of producing a pressure sensitive adhesive coated sheet comprising forming a pressure sensitive adhesive film on a supporting surface, priming said pressure sensitive adhesive film by coating the exposed adhesive surface of said adhesive film with a primer which improves the bond between the adhesive and a subsequently applied permanent backing, the primer being applied in a water base, drying said primed adhesive film, and bonding said primed adhesive film to said backing to form a laminated structure of adhesive and backing by pressing the primed adhesive film into intimate contact with said permanent backing and then removing said laminate from said supporting surface.

2. The method of claim 1 in which during said bonding said primed adhesive film and said backing are maintained at a temperature of at least 200° Fahrenheit, but substantially below the softening temperature of said backing.

3. The method of claim 2 in which said backing is an organic film.

4. The method of claim 3 in which said organic film is chosen from the group consisting of polyvinyl chloride and polyvinyl chloride-polyvinyl acetate copolymers, and in which said temperature at which said primed adhesive film and said backing is maintained during bonding is between about 200° Fahrenheit and about 300° Fahrenheit.

References Cited

UNITED STATES PATENTS

| 2,903,379 | 8/1959 | Norland et al. | 117—76 |
| 2,937,956 | 5/1960 | Fendius et al. | 117—76 |
| 3,039,907 | 6/1962 | Scholl | 161—40 X |
| 3,176,584 | 4/1965 | De Vries et al. | 156—278 X |
| 3,257,252 | 6/1966 | Keel | 156—247 X |
| 3,312,563 | 4/1967 | Rusch | 117—76 |

ROBERT F. BURNETT, *Primary Examiner.*

MORRIS SUSSMAN, *Examiner.*

R. H. CRISS, *Assistant Examiner.*